United States Patent
Pelton

[11] Patent Number: 5,275,385
[45] Date of Patent: Jan. 4, 1994

[54] ROTOR SPEED CONTROL FOR AN ALUMINUM REFINING SYSTEM

[75] Inventor: John F. Pelton, Yorktown Heights, N.Y.

[73] Assignee: Praxair Technology, Inc., Danbury, Conn.

[21] Appl. No.: 993,867

[22] Filed: Dec. 23, 1992

[51] Int. Cl.$^5$ ............................................. C21C 7/00
[52] U.S. Cl. .................................................. 266/233
[58] Field of Search ..................................... 266/233

[56] References Cited

U.S. PATENT DOCUMENTS

| | | | |
|---|---|---|---|
| 3,554,518 | 1/1971 | Ostberg | 266/34 |
| 4,468,972 | 9/1984 | Fisher et al. | 73/861.38 |
| 4,611,790 | 9/1986 | Otsuka et al. | 266/35 |
| 4,784,374 | 11/1988 | Pelton | 266/215 |
| 4,954,167 | 9/1990 | Cooper | 75/708 |

OTHER PUBLICATIONS

U.S. Ser. No. 656,849, Feb. 1991, Pelton.

Primary Examiner—Peter D. Rosenberg
Attorney, Agent, or Firm—Alvin H. Fritschler

[57] ABSTRACT

The rotor drive of an aluminum refining system is operated under constant current, rather than at constant rotor speed. As a result, smooth, stable refining operations are conveniently achieved in commercial practice.

6 Claims, 4 Drawing Sheets

ROTOR SPEED CONTROL FOR AN ALUMINUM REFINING SYSTEM

BACKGROUND OF THE INVENTION

1. Field of the Invention

This invention relates to the refining of aluminum. More particularly, it relates to the control of the rotor speed of an aluminum refining system.

2. Description of the Prior Art

Molten aluminum, as derived from most common sources, such as primary metal, scrap and re-melt ingot, usually must be refined, or purified, before being cast into ingots, sheets or bars. This can be accomplished by bubbling an inert sparging gas, e.g., nitrogen or argon, through the aluminum present in molten form in a refining vessel. In some instances, chlorine is also employed. In such refining operations, dissolved hydrogen, nonmetallic particles and alkaline and alkaline-earth metals are removed from the molten aluminum. For maximum effectiveness and economical gas usage, the sparging gas is dispersed in the body of molten aluminum in the form of fine bubbles. Such dispersion is advantageously accomplished by the use of a spinning nozzle for the injection of the sparging gas into the molten aluminum.

The refining rate of such a spinning nozzle system can be increased by increasing the flow rate of the sparging gas or gases employed. It is usually necessary, in addition, to increase the nozzle rotating speed to continue the desired formation of small gas bubbles and the dispersing of said bubbles throughout the molten aluminum in the refining zone of the system. Such increase in gas flow and nozzle rotating speed is usually accomplished by increased turbulence on the surface of the molten aluminum. The maximum refining rate for a given refining system is limited by the maximum surface turbulence that can be tolerated in said system.

One very effective manner of using small bubbles and dispersing them in a body of molten aluminum is by the use of a spinning nozzle positioned within said body of molten aluminum in the SNIF ™ systems of Praxair, Inc. as shown in the Pelton patent, U.S. Pat. No. 4,784,374. In the usual operation of such a system, the spinning nozzle rotor is driven at a constant speed. This is accomplished by driving the rotor with an electric motor controlled by a variable speed electric drive. This allows the rotor speed to be set out at an appropriate value for a particular operation being carried out in the refining system. The rotor speed may be set at different values depending on such variations as process gas flow and system size. Once the speed is set at its optimum value, however, it will remain constant during the refining operation. Short time variations in liquid flow into the rotor will result in variations in load on the rotor and on the motor that drives it. These variations are reflected in variations in motor current as a result of the normal functioning of the control unit used to maintain constant speed. However, average motor current varies smoothly and continuously with the set speed as shown in FIG. 1 of the drawings.

In a high refining capacity system, there is a discontinuity in the speed vs. current relationship as shown in FIG. 2 of the drawings. If the sparging gas flow is commenced and then the drive motor is turned on with the speed set at 450 rpm, the average current will be shown at point A. As the speed is increased by adjusting the speed control dial on the motor drive unit, the average current will increase slowly and continuously as shown by the lower line in FIG. 2, through points E and F until point B at 550 rpm is reached. A further increase in speed setting to 575 rpm will cause the current to increase rapidly to point C on the upper line of FIG. 2. If the speed setting is now decreased, the current will decrease slowly and continuously along values shown on the upper line until point D is reached at 500 rpm. If the speed is lowered to 475 rpm, the current rapidly drops to point E on the lower line.

When operating at any speed-current relations shown on the bottom line of FIG. 2, the bubble pattern obtained in the refining vessel is as shown in FIG. 3. Thus, the bubbles go rapidly upward and produce a rough surface around the spinning nozzle. This is undesirable, both from a refining rate standpoint and with respect to surface roughness.

When operating at any speed-current relation shown on the upper line of FIG. 2, the bubble pattern is as shown in FIG. 4. In this case, the bubbles flow in an outward and somewhat downward direction in the refining vessel, resulting in much better bubble distribution within the refining vessel. This produces a smoother molten metal surface and a higher refining rate compared with operation at point B on the lower line of FIG. 2. However, the surface is not as desirably smooth as it can be. The smoothest surface is obtained by reducing the rotor speed until point D is reached.

After having determined where optimal point D is by the foregoing procedure, it is possible to reach said point D by another route. This is to start rotation at the point D valve, with no gas flow, or with relatively low gas flow, and then to turn on full gas flow after a few seconds of said operation.

By whatever route point D is reached, it has not been possible to operate at this optimal point for very long with speed control in conventional aluminum refining practices. There will occasionally be swings in molten aluminum flow pattern in the refining chamber. As a result, the drive motor current will be found to drop suddenly to point F on the lower line of FIG. 2, with its undesirable bubble pattern. In this circumstance, the desirable operating point D may be re-established only by going through one of the two routes described above.

In practical commercial operations in which the refining system is operated with conventional speed control alone, it is necessary to operate at a higher speed and current than at point D, as, for instance, at point C on FIG. 2. This will provide stable and repeatable operation with the desired bubble pattern, but the surface of the molten aluminum will be much rougher than at the desired point D.

There is a need in the art, therefore, for improvement in the operation of systems for the refining of molten aluminum. Specifically, there is a need for improved means for controlling the rotor speed so as to reach and maintain the optimal point of speed-current during continued refining operations.

It is an object of the invention, therefore, to provide an improved rotor speed control for an aluminum refining system.

It is another object to provide a rotor speed control enabling optimal conditions to be achieved and maintained during refining operations.

With these and other objects in mind, the invention is hereinafter described in detail, the novel features thereof being particularly pointed out in the appended claims.

SUMMARY OF THE INVENTION

A smooth, stable aluminum refining operation is obtained by operating the rotor drive of an aluminum refining system at a constant current condition, rather than at a constant speed.

BRIEF DESCRIPTION OF THE DRAWINGS

The invention is described herein with reference to the accompanying drawings referred to above in which.

DETAILED DESCRIPTION OF THE INVENTION

Figure 2:
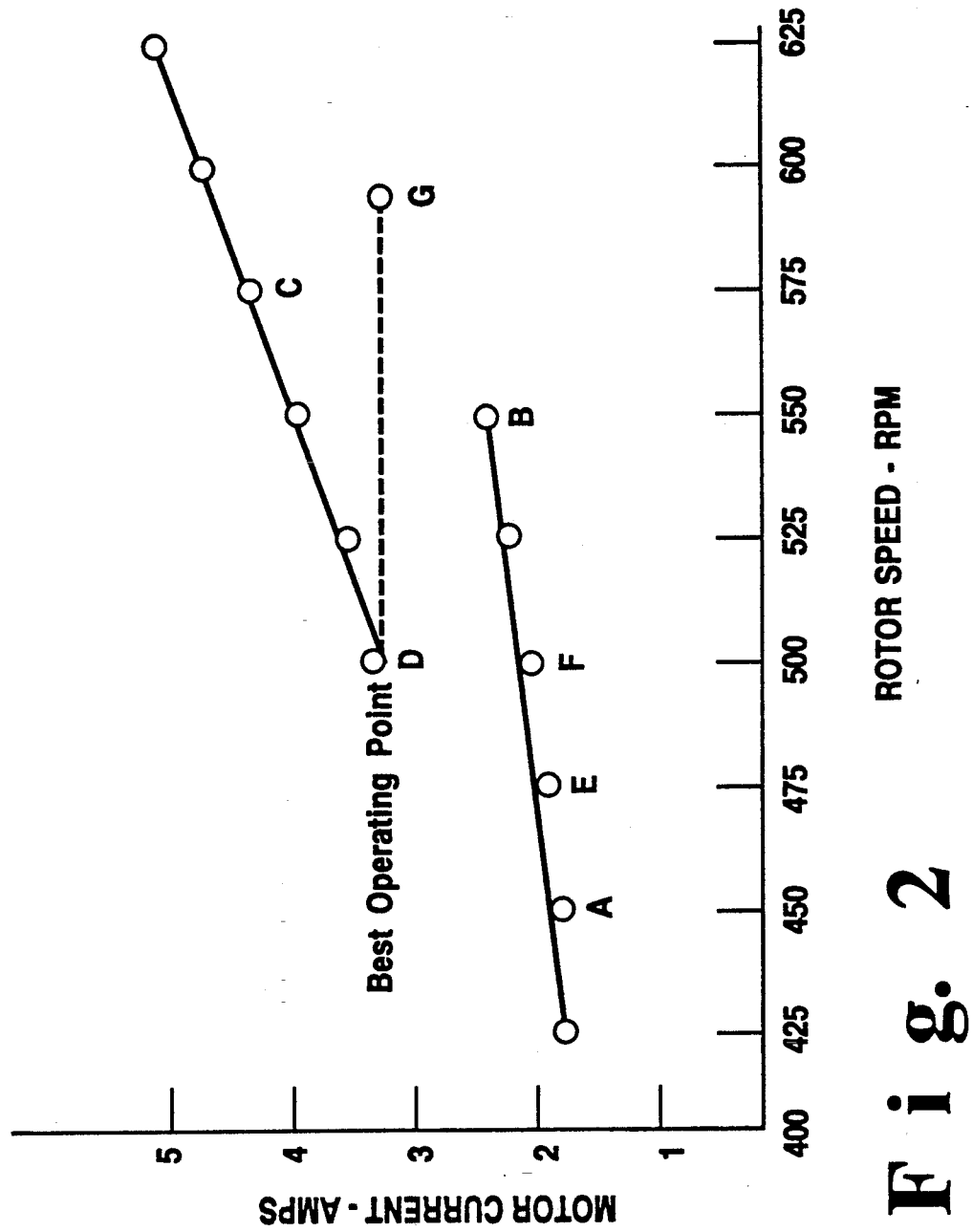
FIG. 2 is a plot of drive motor current vs. rotor speed for a high capacity aluminum refining system, illustrating a discontinuity therebetween as discussed above.

It has been found that the objects of the invention can be accomplished, so that operation at the desired optimal point, i.e., point D of FIG. 2, can be achieved by changing the established mode of operations of the commercially available variable speed motor drive control unit used for aluminum refining operations. In the practice of the invention, operation at the desired point D can be achieved, both with respect to reliably achieving such optimal condition on start-up of the refining system and maintaining the optimal condition during continued operation of the refining system. The change in the mode of operation is based on the operation of the rotor drive at constant current rather than at a constant speed as in current practice. As a result, a smooth stable refining operation is achieved. This results in a smoother surface of molten aluminum within the refining chamber, and a higher refining rate for the refining system.

The variable speed motor drive control unit, as supplied by a commercial manufacturer, will typically be equipped with an available torque control dial, in addition to the usual speed control dial, and can be used in the practice of the invention. The torque control dial is, in reality, a current, limit control means. When operating in accordance with the desirable control mode of the invention, the speed control is set up to the maximum safe operating speed of the spinning nozzle. This will usually be at full speed on the speed control dial. The torque dial, i.e., current limit, is then set at the lowest value at which stable operation is obtained, e.g., point D on FIG. 2.

If the drive control unit is started and the sparging gas flow on, with the drive means and the flow of sparging gas through the spinning nozzle assembly conveniently, but not necessarily, being activated at the same time, and the settings of speed and current as indicated above, the speed will rise rapidly, while the current rises slowly, somewhat as shown on the lower line of FIG. 2. There will then be a rapid increase in motor current as the flow pattern of the refiner changes from the FIG. 3 mode of operation, toward the FIG. 4 mode, and a condition as shown at point G on FIG. 2 may be reached. It will be understood that the current cannot go to a point on the upper line above point G because of the operation of the current limit as indicated above. As the loading on the rotor tends to increase during the continued change to the FIG. 4 mode, the rotor speed will decrease, while the current remains constant. Under such circumstances, the current-speed relation will follow the dotted line to the left on FIG. 2 until point D is reached. While operating at this desired condition, any flow change that would decrease motor current and lead to operation at point F, when operating with speed control, will, instead, result in the speed going up along the dotted line of FIG. 2. This will re-establish and maintain the desired flow pattern within the refining chamber. When the control panel of the motor drive control unit is observed in this operating mode, it will be seen that the motor current is constant, and the motor speed is fluctuating.

In the practice of the invention, the best operating point, i.e., point D on FIG. 2, can be located by the following procedure. The internal current limit of the motor is set at the rated full load current thereof, and the external torque dial, i.e., current limit control, is turned all the way up to the limit thereof. With gas flow on and the spinning nozzle rotation started at a moderate speed, the speed is adjusted upward until a good bubble distribution is obtained. In this condition, no concentration of bubbles will appear on the surface around and near the spinning nozzle. As noted above, this point will be signaled by a rapid rise in motor current. The speed is then adjusted downwardly slowly until a point is reached where the current drops suddenly, and the surface of the molten aluminum becomes rough around the spinning nozzle. The speed at which this occurs is noted. The speed is again increased slightly above the point where a sudden increase in current occurs, and a good bubble pattern is again obtained. Then the torque control, i.e., current limit, is adjusted downward until the speed is reduced to a little above the point where the sudden current drop previously occurred. The speed control dial is then adjusted up to a previously determined maximum safe speed. No change in speed will occur, but more over-speed will be available to quickly establish the desirable bubble pattern on future start-ups.

The current limit setting required for best refining performances may change, from time-to-time, due to changes in friction in the various parts of the rotating system. It will be understood, by those skilled in the art, that it is the torque delivered to the spinning nozzle rotor that must be held constant. The objective here is to keep the average nozzle speed the same as that determined during the original set-up procedure. Any time the average speed is found to be off-target, it can be brought into the desired range by re-adjusting the torque control, i.e., current limit, of the invention. It may be desirable, however, to construct an automatic device for this purpose. Both the refining system operator and the desirable automatic control can be instructed to observe the operating current and to verify that it is about the level of point D and not down to the undesirable low level of point F of FIG. 2.

While the invention can be practiced in any refining system, the primary benefit of the current limit control system of the invention occurs when employed in a refining system having a particular baffle means positioned in the refining system and a particular rotor as described in U.S. patent application No. 656,849, filed Feb. 19, 1991, in the name of John F. Pelton. The particular baffle means, as described therein, comprises a vertical, refractory baffle means positioned on the floor of and across the refining chamber so as to be located under the rotor portion of the spinning nozzle assembly upon placement of said assembly in the refining chamber. Such baffle means, illustrated by the letter A in FIG. 4 of the drawings, is conveniently located under the center of the rotor portion of the assembly, and is conveniently composed of silicon carbide although it can also be composed of other refractory materials. The particular baffle means is desirably of a rectangular configuration, although an essentially triangular cross section or other desired shape can be employed. Said baffle means desirably has raised end sections in the vicinity of the walls of the refining chamber, with the height of the baffle means being about 2" to about 8" typically about 3" to about 5", in the portion thereof beneath the rotor.

Figure 1:
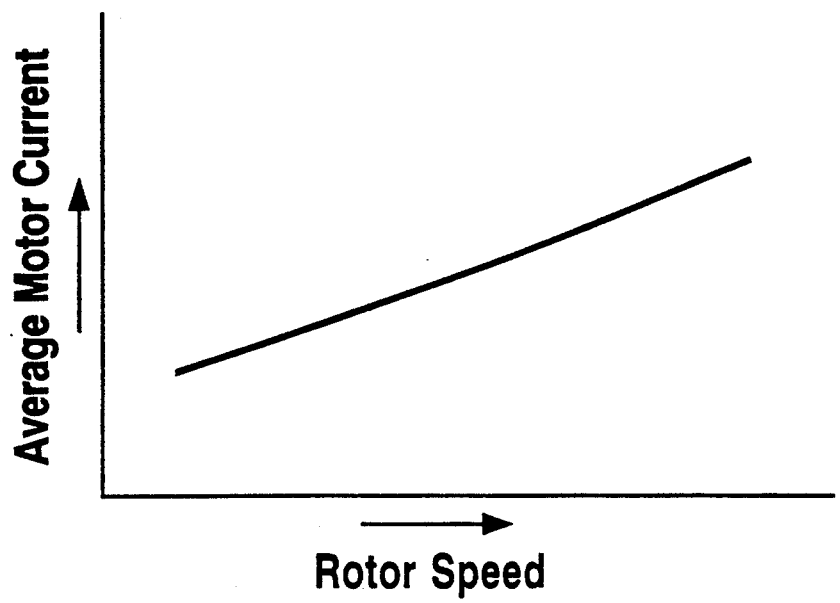
FIG. 1 is a plot of average drive motor current vs. rotor speed for aluminum refining systems, illustrating generally the smooth and continuous variation of said average drive motor current with the rotor speed.
Figure 5:
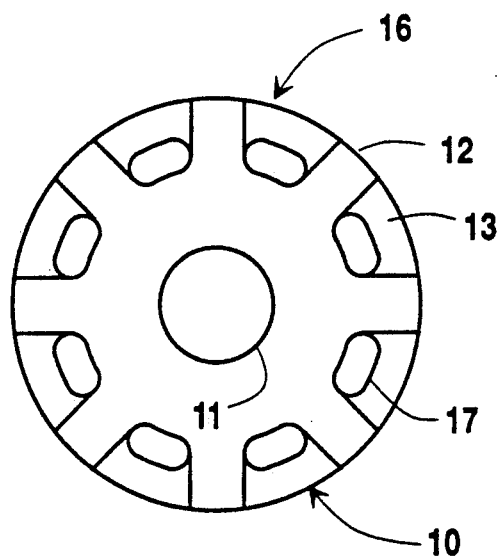
FIG. 5 is a plan view of a special rotor configuration used in particular embodiments of the invention.
Figure 3:
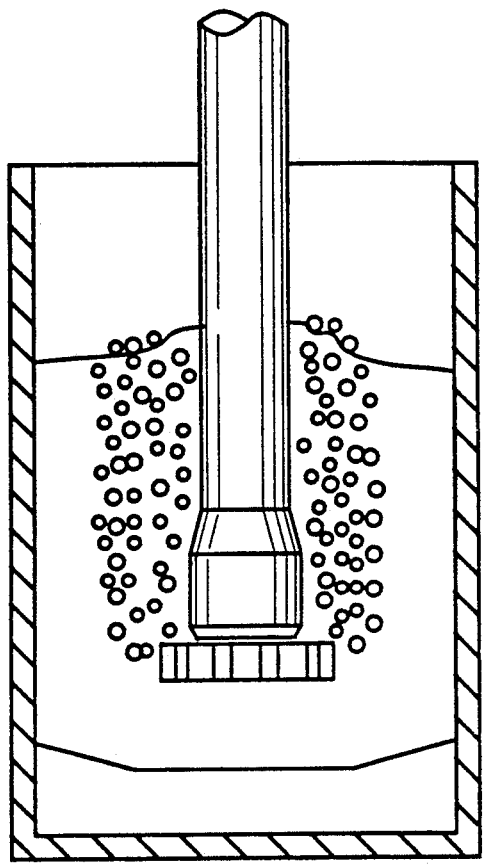
FIG. 3 is a schematic diagram of an aluminum refining system, showing a refining chamber and spinning nozzle assembly, illustrating the bubble patterns obtained when operating at any of the speed-current relations shown on the bottom line of FIG. 2.
Figure 4:
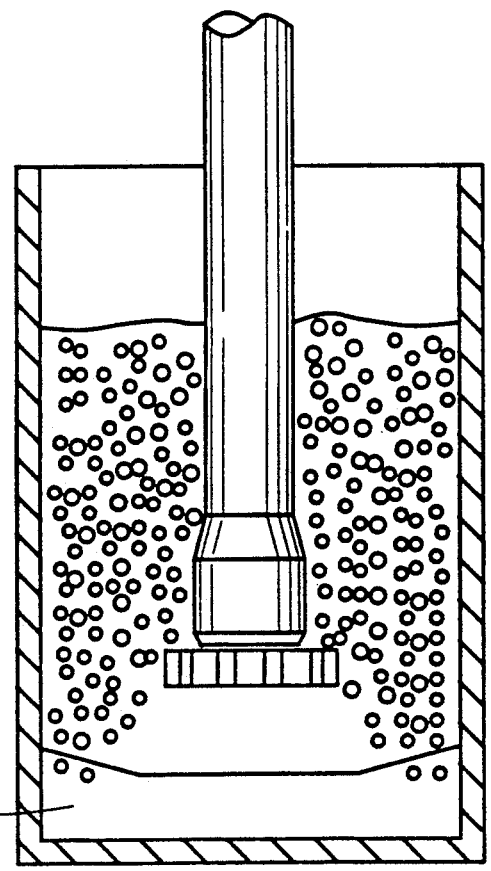
FIG. 4 is a schematic diagram of an aluminum refining system, showing a refining chamber and spinning nozzle assembly, illustrating the bubble patterns obtained when operating at any of the speed-current relations shown on the upper line of FIG. 2.
Figure 6:
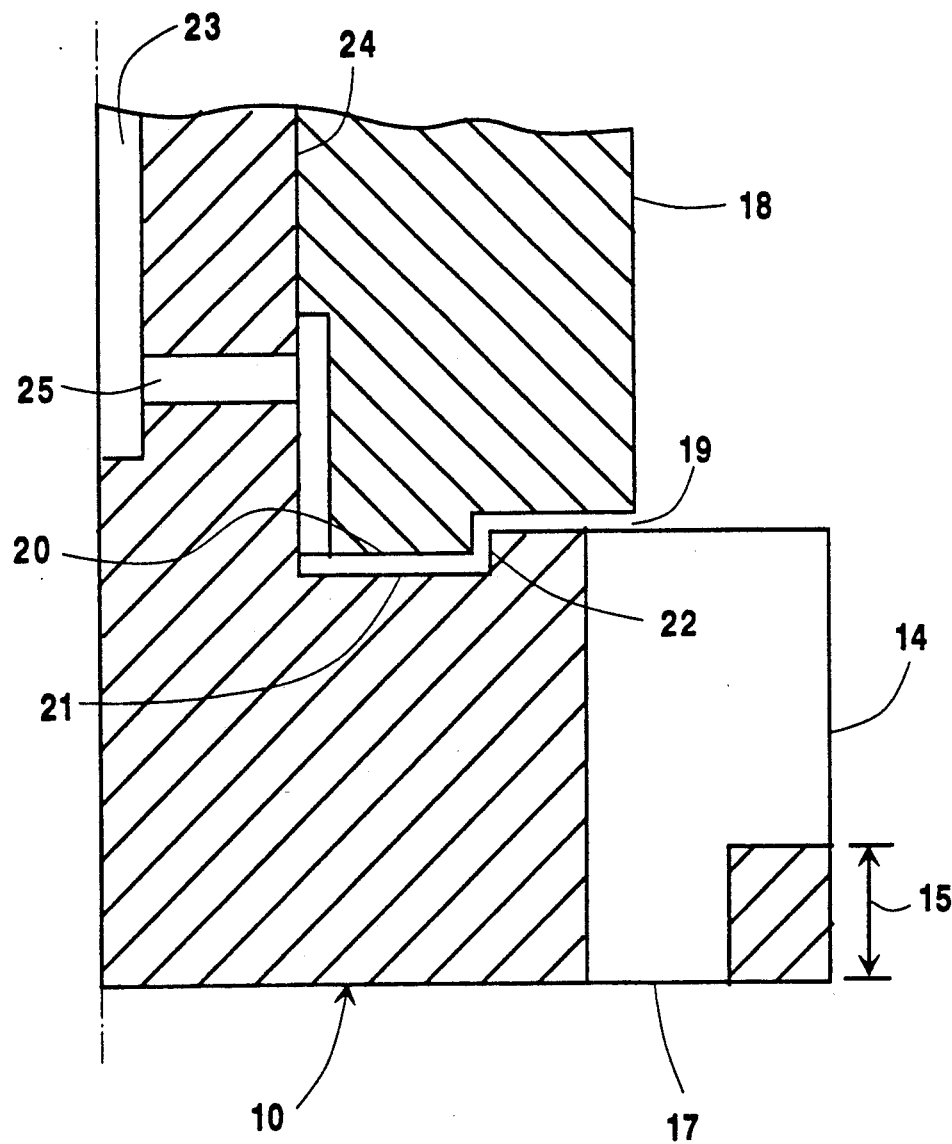
FIG. 6 is a side elevational view of the rotor of FIG. 5, together with a stator used in conjunction therewith in particular embodiments of the invention.

The particular rotor, which enables refining rates to be obtained at a given surface roughness in conjunction with the use of the particular baffle means described above, is shown in plan view in FIG. 5 and in side view in conjunction with a desirable companion stator shape in FIG. 6. The essential difference between the particular, or special, rotor and a conventional vaned rotor, as shown generally in FIGS. 3 and 4, is that the liquid entry from the bottom of the rotor is partially restricted, while liquid entry from the top of the rotor is not so restricted. The special rotor design also directs the flow of liquid from the bottom into the base of the rotor slots and in a mostly upward direction. In addition, this special rotor configuration presents a continuous circular shape on its lower outer edge. This shape is much less subject to damage from hard solid pieces of foreign material that may be drawn up and into the rotor during commercial operations.

The special rotor, represented by the numeral 10 and mounted on rotor drive shaft 11 in FIG. 5, has vanes 12 positioned around the rotor periphery, with slots 13 located between adjacent vanes. As shown in FIG. 6 and unlike a conventional rotor, slots 13 do not extend for the full height of adjacent vanes 12 but for only a slot portion 14 thereof. Below said slot portion 14, restricted portion 15 remains and forms, together with adjacent vanes 12, a cylindrical base portion 16 of rotor 10, as will be seen in FIG. 5. In order to provide for passage of molten aluminum from the region below the rotor to slot portion 14, openings or holes 17 are provided in each said restricted portion 15. Said openings 17 are preferably positioned essentially at the innermost end of restricted portion 15, and provide access for molten aluminum to slot portion 14 of each slot 13, preferably toward the innermost portion thereof for enhanced molten liquid flow effect.

In the use of special rotor in the practice of the invention, it is desirable that the process gas enter the rotor continuously and uniformly in all rotor slots 14. However, the turbulent motion of the liquid as it approaches the rotor from above tends to produce a non-uniform gas flow to the rotor. If, for example, the liquid momentarily flows toward the rotor more rapidly from one side thereof, it tends to shut off the gas exiting on that side and to increase the flow to other parts of the rotor. This tendency can be reduced by making the gap 19 between the top of rotor 10 and the bottom of stator 18 very small so as to produce an appreciable pressure drop at this point. For such purpose in practice, however, it is necessary to reduce this gap to about 0.020" or less for most embodiments. Since the gap is set during assembly of the rotor-stator unit at a desired plant location, the achieving of this very small gap is dependent upon the care and skill with which it is assembled. In addition, the gap can change in operation due to temperature changes and the like. A more suitable means for achieving such gas flow control is thus desired for practical commercial applications.

As shown in FIG. 6, a preferred means for achieving desired gas flow control is obtained simply by the inclusion of a stator boss and corresponding rotor recess. Thus, boss portion 20 is provided at the bottom end of stator 18 and is adapted to fit into a recess portion 21 at the top of rotor 10. The small gap passage required to produce more uniform gas distribution throughout the rotor is provided by radial gap 22 between the outside diameter of boss 20 and the inside diameter of recess 21 on the side toward slot 14. This gap 22 can be controlled at the point of manufacture and is not dependent, as is a conventional small gap between the top of the rotor and the bottom of the stator, upon the care and skill of assembly of the rotor-stator unit. Small radial gap 22 will generally be controlled at about 0.025", although somewhat larger or smaller distances can also be employed depending upon the overall structure of the unit and of the refining chamber and application with which it is to be employed. In this preferred embodiment, stator boss portion 20 and rotor recess portion 21 can both be about ¼" high or deep in common practice. The vertical gap 19 between the bottom of stator 18 and the top of rotor 10, and between the bottom of stator boss portion 20 and the top of rotor recess portion 21, can be set at a greater tolerance, e.g., about 1/16" with the exact setting not being critical for the desired gas flow control purposes. As shown in the illustrated embodiment of FIG. 6, process gas passes downward through gas entry passage 23 adjacent rotor shaft-stator bearing 24, and through gas passageway 25 to stator-rotor gap 19, including small radial gas 22 for the desired gas flow control. The gas exits from stator-rotor gap 19 and enters rotor slots 14 in a continuous and uniform manner. The stator diameter is preferably made slightly larger than the root diameter of the rotor, i.e., the diameter at the base of the vanes, so that the process or sparging gas is caused to pass downward into the rotor slots by the downward flow of molten aluminum, and none of said process gas is allowed to escape upward and avoid being dispersed by the action of the rotor. When no stator is employed, the process gas is introduced into the rotor via holes that lead to the spaces between rotor vanes. In the absence of a stator, it may be desirable to employ a cylindrical abutment to essentially duplicate the function of the stator in directing the flow of process gas downward.

The area of the openings 17 in restricted portion 15 in the bottom of the rotor in relation to the total opening, if unrestricted, is generally in the range of from about 25% to about 75%, with an opening area of about 50% being preferred. The height of restricted portion 15 of rotor 10 should be generally in the range of from about 20% to about 40% of the overall rotor height, with a restricted portion height of abut 30% being preferred for use in typical sized refining chamber units.

The rotor as shown in FIG. 5 has rounded corners at the base of the vanes, and the holes for molten aluminum entry from below the rotor also have rounded edges. While the radii thereof are not essential to the performance of the rotor, they result from a convenient means of machining the rotor by cutting slots and entry holes therein with a vertically oriented end mill.

The practice of the invention, in combination with said particular baffle means and special rotor, is highly effective in overcoming the instability range noted in the operation of such a desirable refining system structure. In some instances in which very little or no instability range is observed in a particular refining operation, including such an operation in which a conventional rotor is employed with said baffle means, the current limit control technique of the invention may have little, if any, benefit as compared to conventional speed control operations.

Those skilled in the art will appreciate that a number of variable speed drives are commercially available and can be employed in the practice of the invention. A 2 HP variable speed DC motor made by Reliance Electric Co. is a representative example of a suitable variable speed drive motor that can be used in the practice of the invention. The motor is conveniently connected to the spinning nozzle through a 2.7 ratio gear reducer. The controller therefor is the Min Pac plus D.C. vs. Drive supplied by the same manufacturer. It is equipped with two front panel adjustments, one labelled torque and one labelled speed. An internal current limit adjustment is set at the rated full load current of the motor for protection of the motor and related equipment.

The invention enables aluminum refining to be carried out with a highly advantageous smooth and stable operation. As such, it addresses a significant problem encountered in practical commercial operations, and thus provides a highly desirable advance in the aluminum refining art.

I claim:

1. In the operation of an aluminum refining system in which a spinning nozzle assembly is positioned in a refining chamber, said spinning nozzle assembly having variable speed electric drive means for rotation thereof in a body of molten aluminum in the refining chamber, an improved spinning nozzle assembly driving control method comprising:
   (a) setting the speed control of a variable speed electric drive means at an upper operating speed of said spinning nozzle assembly;
   (b) setting a variable speed electric drive means current limit control at about the lowest value at which refining operations with a smooth molten metal surface can be obtained; and
   (c) activating said variable speed electric drive means with said settings of the speed control and current limit control thereof, and flowing sparging gas through the spinning nozzle assembly, the speed of the variable speed electric drive means decreasing while the current in said variable speed electric drive means remains constant, so as to reach and maintain a desirable flow pattern of bubbles in the refining chamber, whereby operation under a constant current condition enables an optimum point of the current-speed relationship to be reliably reached and maintained in the course of refining operations.

2. The control method of claim 1 and including determining an optimum point of said current-speed relationship by:
   (a) setting the internal current limit at the rated full load current of the drive means and turning the current limit control thereof to its highest value;
   (b) adjusting the spinning nozzle assembly speed, with sparging gas flowing therethrough, from a moderate speed upward until a bubble distribution across the refining chamber is achieved, a rapid rise in drive means current occurring as a result thereof;
   (c) decreasing the spinning nozzle speed slowly until a point is reached where the current drops suddenly, and the surface of the molten aluminum in the refining chamber becomes rough around the spinning nozzle assembly;
   (d) increasing the spinning nozzle speed to slightly above the point at which a sudden increase in current occurs and the desired bubble pattern is again obtained;
   (e) adjusting the current limit downward until the spinning nozzle speed is reduced to slightly above the point where the sudden current drop previously occurred; and
   (f) adjusting the speed control to the predetermined maximum safe speed of the spinning nozzle assembly.

3. The control method of claim 1 in which the drive means and the flow of sparging gas through the spinning nozzle assembly is activated at the same time.

4. The control method of claim 1 in which the refining chamber has (1) vertical, refractory baffle means positioned on the floor of and across said refining chamber at a position under the rotor portion of the spinning nozzle assembly, and (2) said rotor comprises a vaned rotor containing alternate vanes and slots around the periphery thereof, said slots extending only a portion of the length downward from the top of the rotor, with restricted portions thereunder, said restricted portions containing openings therein for the passage of molten aluminum therethrough upon use of said rotor.

5. The control method of claim 4 in which said openings are positioned at the innermost portion of the slots, said restricted portions having a height in the range of from about 20% to about 40% of the overall height of the rotor vanes.

6. The control method of claim 4 and including stator means adapted for the passing of sparging gas therethrough for discharge to the vaned rotor, the vertical gap between the top of the rotor and the bottom of the stator being set at a very small distance to provide a pressure drop enabling essentially uniform flow of sparging gas therethrough to the rotor and including a boss portion of the stator and a corresponding recess portion of the rotor to form a small radial gap between the outside diameter of said boss portion and the inside diameter of said recess portion to further provide a pressure drop assuring an essentially uniform flow of sparging gas therethrough to the rotor.

* * * * *